(12) United States Patent
Yang et al.

(10) Patent No.: US 8,912,750 B2
(45) Date of Patent: Dec. 16, 2014

(54) CHARGER

(75) Inventors: Chun Suk Yang, Seongnam (KR); Jae Ho Lee, Bucheon (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 962 days.

(21) Appl. No.: 13/012,731

(22) Filed: Jan. 24, 2011

(65) Prior Publication Data

US 2011/0181236 A1   Jul. 28, 2011

(30) Foreign Application Priority Data

Jan. 25, 2010 (KR) .......................... 10-2010-0006702

(51) Int. Cl.
*H02J 7/00* (2006.01)
*H02J 7/02* (2006.01)
*B60L 11/18* (2006.01)

(52) U.S. Cl.
CPC ............. *H02J 7/022* (2013.01); *B60L 11/1868* (2013.01); *Y02T 10/7005* (2013.01); *Y02T 10/7066* (2013.01)
USPC ........... 320/107; 320/109; 320/128; 318/440; 318/441; 318/442

(58) Field of Classification Search
USPC ......................................................... 320/107
See application file for complete search history.

(56) References Cited

U.S. PATENT DOCUMENTS

| | | | |
|---|---|---|---|
| 3,665,495 A * | 5/1972 | Carter et al. .................... | 307/67 |
| 4,068,293 A * | 1/1978 | Staruch et al. .................. | 363/27 |
| 5,698,963 A | 12/1997 | Seong et al. | |
| 7,372,222 B2 * | 5/2008 | Ishikawa et al. .............. | 318/139 |
| 7,796,410 B2 * | 9/2010 | Takayanagi et al. ........... | 363/37 |
| 8,054,025 B2 * | 11/2011 | Oyobe et al. .................. | 318/441 |
| 2008/0100273 A1 | 5/2008 | Uruno et al. | |
| 2008/0316774 A1 | 12/2008 | Ito et al. | |

(Continued)

FOREIGN PATENT DOCUMENTS

| EP | 0834977 | 4/1998 |
|---|---|---|
| JP | 5207664 | 8/1993 |

(Continued)

OTHER PUBLICATIONS

Korean Intellectual Property Office Application Serial No. 10-2010-0006702, Office Action dated Aug. 11, 2010 5 pages.

(Continued)

*Primary Examiner* — Edward Tso
*Assistant Examiner* — Johali Torres Ruiz
(74) *Attorney, Agent, or Firm* — Lee, Hong, Degerman, Kang & Waimey

(57) ABSTRACT

Disclosed is a charger including a first rectifying portion that rectifies an alternating power and outputs the rectified power to a neutral point of a 3-phase motor; a second rectifying portion/inverter that charges output power of the first rectifying portion in a high-voltage battery in a charging mode and drives the 3-phase motor by switching the charged power of the high-voltage battery in a drive mode; a high-voltage charging controller that controls the first rectifying portion and second rectifying portion/inverter so as to charge the high-voltage battery in the charging mode; and a DSP (Digital Signal Processor) that controls the second rectifying portion/inverter so as to drive the 3-phase motor in the drive mode, and controls the high-voltage charging controller so as to charge the high-voltage battery in the charging mode.

11 Claims, 6 Drawing Sheets

(56) References Cited

U.S. PATENT DOCUMENTS

| | | |
|---|---|---|
| 2009/0103341 A1 | 4/2009 | Lee et al. |
| 2010/0044160 A1* | 2/2010 | Agirman et al. .............. 187/290 |
| 2011/0050173 A1* | 3/2011 | King et al. ................... 320/128 |

FOREIGN PATENT DOCUMENTS

| | | |
|---|---|---|
| JP | 3284571 | 3/2002 |
| JP | 2007068362 | 3/2007 |
| JP | 2008312395 | 12/2008 |

OTHER PUBLICATIONS

Sahan, et al., "A Single-Stage PV Module Integrated Converter Based on a Low-Power Current-Source Inverter", IEEE Transactions on Industrial Electronics, vol. 55, No. 7, Jul. 2008, 8 pages, XP11229268.

European Patent Office Application Serial No. 11152037.5, Search Report dated May 11, 2011, 8 pages.

State Intellectual Property Office of the People's Republic of China Application Serial No. 201110031983.1, Office Action dated Feb. 4, 2013, 9 pages.

\* cited by examiner

CHARGER

Pursuant to 35 U.S.C.§119 (a), this application claims the benefit of earlier filing date and right of priority to Korean Patent Application No. 10-2010-0006702, filed on Jan. 25, 2010, the contents of which are hereby incorporated by reference in their entirety.

BACKGROUND OF THE DISCLOSURE

1. Field of the Invention

The present disclosure relates to a charger that charges a high-voltage battery and a low-voltage battery, the high-voltage battery providing a 3-phase motor equipped in an electric vehicle with a driving power, the low-voltage battery providing electronic elements and a lamp device equipped in the electric vehicle with an operating power. More particularly, the present disclosure relates to a charger that charges the high-voltage battery, charges the low-voltage battery using the power charged in the high-voltage battery while controlling a power factor of an input commercial AC (alternating Current) power at about 1 by operating a buck-type single-phase rectifier, a 3-phase motor and an inverter in a buck-boost operation, and can combine control and communication using one DSP (Digital Signal Processor) with an advantage of wiring by combining an inverter, a high-voltage charger and a low-voltage charger.

2. Description of the Related Art

Generally, an electric vehicle includes a high-voltage battery in which a high-voltage of about 72V is charged, for example, a 3-phase motor which is driven by power charged in the high-voltage battery and drives the vehicle, and an inverter which drives the 3-phase motor.

However, the method has a limit to drive the 3-pahse motor with the charged power of the high-voltage battery, that is, it is not possible to drive the 3-phase motor any more when the power charged in the high-voltage battery is discharged more than a predetermined power level.

To obviate some or all of the prior art disadvantage, the electric vehicle includes a high-voltage charger that charges the high-voltage battery with its output power.

Further, the electric vehicle includes electronic units, lamp devices and different kinds of loads using a low-voltage power such as 12V power, as well as the 3-pahse motor, which has a low-voltage battery to operate loads which use the low-voltage power and a low-voltage charger to charge the low-voltage battery with a low-voltage power.

However, since the inverter, high-voltage charger and low-voltage charger are included separately with one another, it takes much time and labor to design an electric vehicle having each of the inverter, high-voltage charger and low-voltage charger mounted thereon.

SUMMARY OF THE INVENTION

Therefore, the present disclosure provides a charger that charges a high-voltage battery using a 3-phase motor and an inverter.

Further, the present disclosure provides a charger that charges a low-voltage battery using power charged in a high-voltage battery.

Further, the present disclosure provides a charger that includes an inverter, a high-voltage charger and a low-voltage charger in a body.

A charger according to the present disclosure charges a high-voltage battery while controlling power factor of input commercial alternating power at about 1 by adding a buck-type rectifier and operating the rectifier in a buck-boost manner using a switching of an inductor and inverter of a Y-connected 3-phase motor.

Therefore, in an embodiment of the present disclosure, a charger includes a 3-phase motor that has an Y-connection; a first rectifying portion that rectifies an alternating power and outputs the rectified power to a neutral point of the 3-phase motor; a second rectifying portion/inverter that charges output power of the first rectifying portion in a high-voltage battery in a charging mode and drives the 3-phase motor by switching the charged power of the high-voltage battery in a drive mode; a high-voltage charging controller that controls the first rectifying portion and second rectifying portion/inverter so as to charge the high-voltage battery in the charging mode; and a DSP (Digital Signal Processor) that controls the second rectifying portion/inverter so as to drive the 3-phase motor in the drive mode, and controls the high-voltage charging controller so as to charge the high-voltage battery in the charging mode.

In some exemplary embodiments, the first rectifying portion is a buck-type single-phase rectifier that is coupled to the 3-phase motor and rectifies the alternating power in a Buck type.

In some exemplary embodiments, the first rectifying portion includes: a rectifier that performs a bridge rectification of an input alternating power; and a switching device that switches the output power of the rectifier according to a control of the high-voltage charging controller and outputs the output power to a neutral point of the 3-phase motor, and simultaneously operates with an inverter so as to control power factor of an input commercial alternating power at about 1.

In some exemplary embodiments, the first rectifying portion further includes a filter that performs a filtering of a ripple current generated according to a switching operation and outputs an input alternating power in which a ripple is attenuated to the rectifier.

In some exemplary embodiments, the first rectifying portion further includes a freewheeling diode to form a closed loop when the second rectifying portion/inverter charges the power accumulated in the 3-phase motor into the high-voltage battery.

In some exemplary embodiments, the second rectifying portion/inverter includes a plurality of switching devices wherein each two devices are serially connected as a pair between both terminals of the high-voltage battery; a plurality of diodes that are parallelly connected to the plurality of switching devices, respectively; and a transient voltage suppressor to suppress a transient voltage; wherein terminals of respective phases of the 3-phase motor are connected to connection points between each two switching devices that are serially connected as a pair, respectively.

In some exemplary embodiments, the plurality of switching devices is switched by the DSP in the drive mode, and wherein the plurality of switching devices connected between the terminals of respective phases of the 3-phase motor and a minus terminal of the high-voltage battery are switched by the high-voltage charging controller in the charging mode.

In some exemplary embodiments, the high-voltage charging controller includes a charging state detector that detects a charging state of the high-voltage battery; a charging reference voltage generator that generates a charging reference voltage using output signal of the charging state detector and output voltage of the rectifier; a charging current detector that detects a charging current of the high-voltage battery output from the first rectifying portion; and a switching signal generator that generates a switching signal according to output signals of the charging reference voltage generator and charging current detector and outputs the switching signal to the first rectifying portion and the second rectifying portion/inverter.

In some exemplary embodiments, the first rectifying portion includes a rectifier that performs a bridge rectification of the input alternating power and outputs the rectified power to the neutral point of the 3-phase motor; and a plurality of switching devices that switch a bridge rectification of the input alternating power performed by the rectifier while the plurality of switching devices are switched reciprocally and alternatively according to a control of the high-voltage charging controller.

In some exemplary embodiments, the first rectifying portion further includes a filter that performs a filtering of the input alternating power and outputs the filtered power to the rectifier.

In some exemplary embodiments, the high-voltage charging controller includes a charging state detector that detects a charging state of the high-voltage battery; a charging reference voltage generator that generates a charging reference voltage using output signal of the charging state detector and output voltage of the rectifier; a charging current detector that detects a charging current of the high-voltage battery output from the first rectifying portion; a switching signal generator that generates a switching signal according to output signals of the charging reference voltage generator and the charging current detector and outputs the switching signal to the second rectifying portion/inverter; a polarity determiner that determines a polarity of the input alternating power; an inverter that inverts a switching signal generated by the switching signal generator; and a plurality of switches that are switched according to an output signal of the polarity determiner and selectively output the switching signal generated by the switching signal generator and the output signal of the inverter to gates of the plurality of switching devices.

In some exemplary embodiments, the charging state detector includes a plurality of resistors that divide the charging voltage of the high-voltage battery; an operational amplifier that operates the voltage divided by the plurality of resistors and a floating charging reference voltage of the high-voltage battery which is set in advance and amplifies the operated voltage; and a minimum value selector that compares a level of the output voltage of the operational amplifier with that of an average voltage of the reference current set in advance and selects the minimum value.

In some exemplary embodiments, the charging reference voltage generator includes an attenuator that attenuates the output voltage of the rectifier by an gain set in advance; and a multiplier that multiplies the output voltage of the attenuator by the output voltage of the charging state detector.

In some exemplary embodiments, the charging current detector includes a current transformer that detects a charging current output from the first rectifying portion and an integrator that integrates the charging current detected by the current transformer.

In some exemplary embodiments, the charging current detector further includes a reset unit that removes a magnetic energy accumulated in the current transformer when the current transformer does not detect charging current.

In some exemplary embodiments, the charging current detector further includes a switching device that removes an integrated current accumulated in the integrator according to the switching signal generated by the switching signal generator.

In some exemplary embodiments, the switching signal generator includes a comparator that compares output voltages of the charging reference voltage generator and the charging current detector; and a flip-flop device that is set according to a clock signal and reset according to an output signal of the comparator, and that generates a switching signal and outputs the switching signal to the charging current detector, the first rectifying portion and the second rectifying portion/inverter.

In some exemplary embodiments, the charger further includes a low-voltage charger that charges a charging power of the high-voltage battery into a low-voltage battery; and a low-voltage charging controller that controls the low-voltage charger according to a control of the DSP and charges the charged power of the high-voltage battery into the low-voltage battery.

In some exemplary embodiments, the low-voltage charging portion includes an alternating power converter that switches the power charged in the high-voltage battery and converts the power into an alternating power; a voltage drop portion that drops a voltage level of the alternating power converted by the alternating power converter; and a direct voltage converter that rectifies the alternating power dropped in the voltage drop portion, converts the rectified power into a direct power, and charges the converted power into the low-voltage battery.

In some exemplary embodiments, the low-voltage charging controller includes a current transformer that detects current flowing to the low-voltage battery from the low-voltage charging portion; and a switching controller that generates a switching signal according to a detection current of the current transformer and a charging voltage of the low-voltage battery BAT2 and outputs the switching signal to the alternating power converter.

According to the present disclosure, it is possible to simplify a construction of circuit by adding a buck-type single-phase motor and operating it in the buck-boost manner using a Y-connected 3-phase motor and an inverter, and to simply design an electric vehicle compared with a conventional technology in which an electric vehicle is designed to separately mount an inverter, a high-voltage charger and a low-voltage charger thereon.

Further, according to the present disclosure, it is possible to simplify a communication line connected outside since control can be made with one DSP.

Further, according to the present disclosure, it is possible to charge a low-voltage battery using power charged in a high-voltage battery as well as to charge the high-voltage battery with ease using a 3-phase motor and an inverter.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description, serve to explain the principle of the disclosure. And, an identical reference number is used to refer to the same component shown in some figures. In the drawings.

DETAILED DESCRIPTION OF THE PREFERRED EMBODIMENTS

Hereinafter, a detailed description is nothing but an example and an embodiment of the present disclosure. Further, principle and concept of the present disclosure are provided for the purpose of describing the present disclosure in the most usefully and easily.

Accordingly, while an unnecessarily-detailed construction beyond a basic understanding of the present disclosure is not provided, various forms with which those skilled in the art can implement in the substance of the present disclosure are exemplified through drawings.

Figure 1:
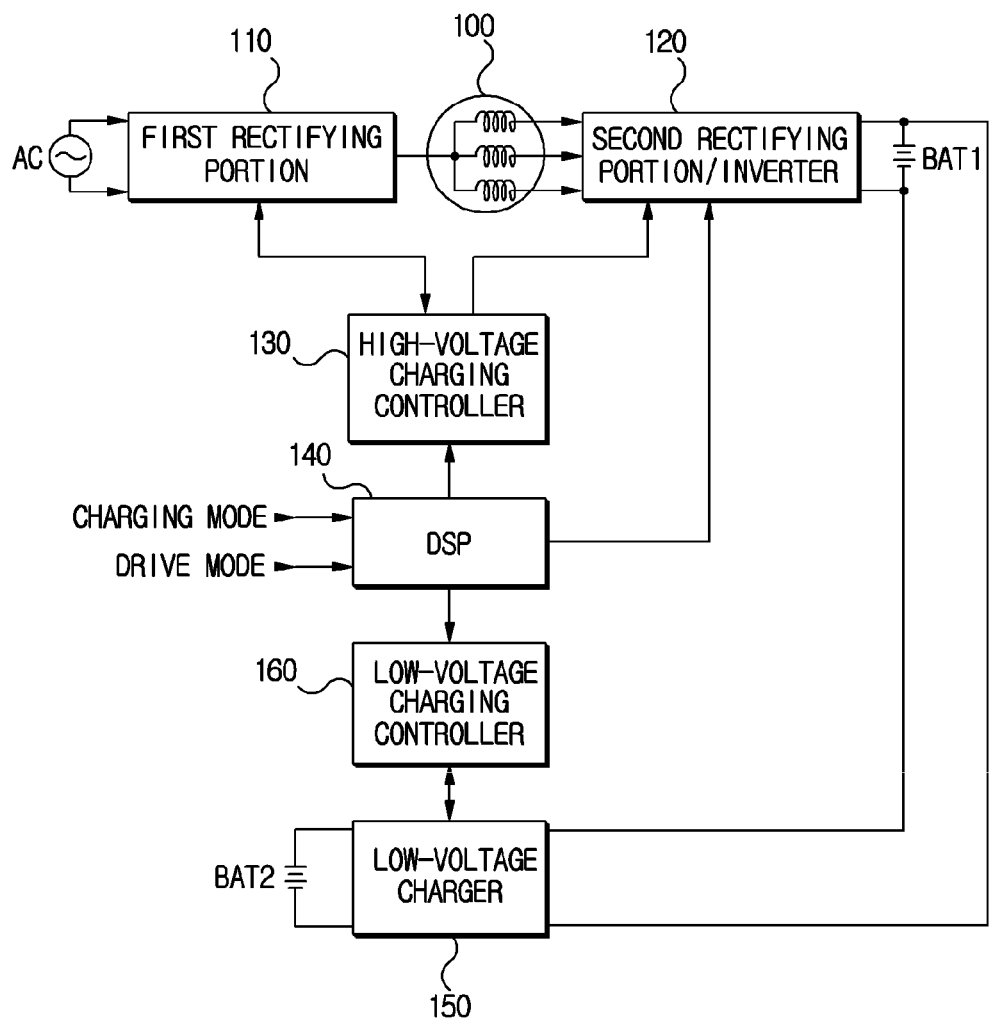
FIG. 1 is a schematic block diagram showing an entire construction of the present disclosure.

FIG. 1 is a schematic block diagram showing an entire construction of the present disclosure. Here, a numeral reference 100 denotes a 3-phase motor. The 3-phase motor 100 has a Y-connected coil.

Numeral reference 110 denotes a first rectifying portion. For example, the first rectifying portion 110 is a buck-type single-phase rectifier that is coupled with the 3-phase motor 100 and rectifies a single-phase alternating power AC in a buck-type manner, which rectifies an input single-phase alternating power AC and outputs the rectified power to a neutral point of the 3-phase motor 100, and simultaneously operates with a switching of an inverter to be described below and charges the high-voltage battery BAT1 while controlling power factor of an input commercial alternating power at about 1.

Numeral reference 120 denotes a second rectifying portion/inverter. The second rectifying portion/inverter 120 is simultaneously switched with the first rectifying portion 110 and accumulates and boosts power in the Y-connected 3-phase motor 100 in a charging mode, thereby charging the high-voltage battery BAT1. Further, the second rectifying portion/inverter 120 generates a 3-phase power using the power charged in the high-voltage battery BAT1 and drives the 3-phase motor 100.

Numeral reference 130 denotes a high-voltage charging controller. The high-voltage charging controller 130 controls the first rectifying portion 110 and second rectifying portion/inverter 120 and charges a high-voltage in the high-voltage battery BAT1 in the charging mode.

Numeral reference 140 denotes a DSP (Digital Signal Processor). The DSP 140 enables the high-voltage charging controller 130 to control the first rectifying portion 110 and second rectifying portion/inverter 120 and to charge the high-voltage in the high-voltage battery BAT1 in the charging mode. Further, the DSP 140 controls the second rectifying portion/inverter 120 so as to drive the 3-phase motor 100 with the charged power of the high-voltage battery BAT1 in a drive mode.

Numeral reference 150 denotes a low-voltage charger. The low-voltage charger 150 charges a low-voltage in the low-voltage battery BAT2 using power charged in the high-voltage battery BAT1.

Numeral reference 160 denotes a low-voltage charging controller. The low-voltage charging controller 160 charges the low-voltage charger 150 according to a control of the DSP 140 and charges a low-voltage in the low-voltage battery BAT2 using power charged in the high-voltage battery BAT1.

In the charger of the present disclosure having such a construction, the high-voltage charging controller 130 controls the first rectifying portion 110 and second rectifying portion/inverter 120 under the control of the DSP 140 in the charging mode, the first rectifying portion 110 rectifies the input commercial alternating power AC, the rectified power is charged in the high-voltage battery BAT1 while controlling power factor of the input commercial alternating power AC at about 1 using a switching of the first rectifying portion 110 and the 3-pahse motor 100 and the second rectifying portion/inverter 120.

Further, the low-voltage charging controller 160 determines a state of the power charged in the low-voltage battery BAT2 according to a control of the DSP 140, controls the low-voltage charger 150 according to the determined state of power, and charges the low-voltage battery BAT2 with a low-voltage using the power charged in the high-voltage battery BAT1.

Figure 2:
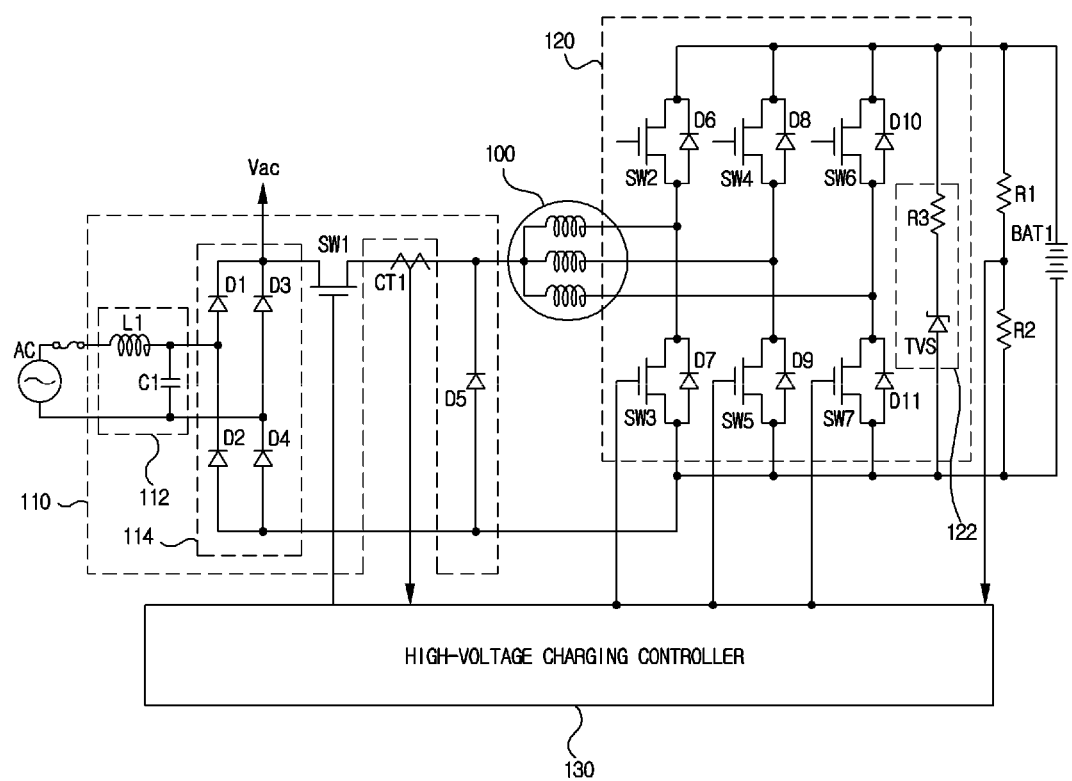
FIG. 2 is a detailed circuit diagram showing a construction of a preferred embodiment of a first rectifying portion and a second rectifying portion/inverter in a charger of the present disclosure.

FIG. 2 is a detailed circuit diagram showing a construction of a preferred embodiment of a first rectifying portion and a second rectifying portion/inverter in a charger of the present disclosure. Referring to FIG. 2, the first rectifying portion 10 includes a filter 112 that filters an alternating power AC input into an inductor L1 and a capacitor C1, a rectifier 114 that rectifies an output power of the filter 112 using diodes D1 to D4, a switching device SW1 that switches an output power of the diodes D1 to D4 according to a control signal output from the high-voltage charging controller 130 and outputs the output power to a neutral point of the 3-phase motor 100, and a freewheeling diode D5 that enables the power accumulated in the 3-phase motor 100 to be charged in the high-voltage battery BAT1 through the second rectifying portion/inverter 120 when the switching device SW1 is in a shut off state.

The second rectifying portion/inverter 120 includes a plurality of witching devices (SW2, SW3) (SW4,SW5) (SW6, SW7) that are parallelly connected to the high-voltage battery BAT1, a plurality of diodes D6 to D11 that are connected between drain and source of each of a plurality of switching devices SW2 to SW7, and a transient voltage suppressor 122 to suppress a transient voltage, control signal output from the high-voltage charging controller 130 being applied to gates of the plurality of switching devices SW3, SW5 and SW7.

The transient voltage suppressor 122 includes a resistor R3 and a diode TV5 to suppress a transient voltage, which is serially connected between both terminals of the high-voltage battery BAT1.

Figure 3:
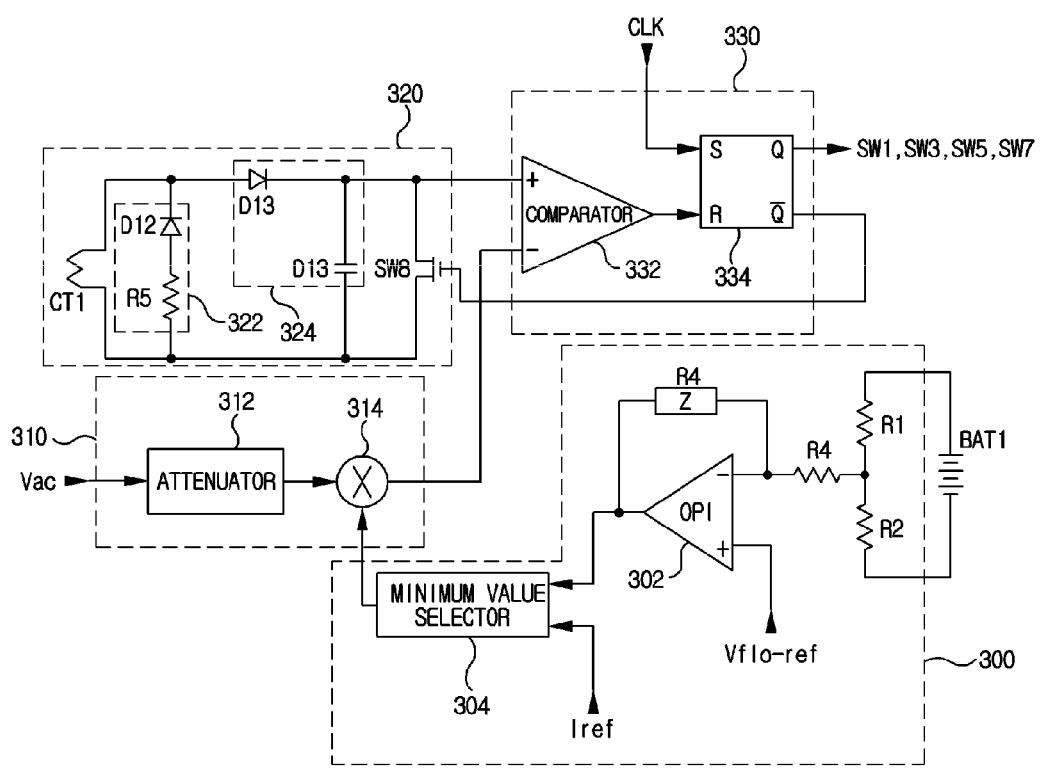
FIG. 3 is a detailed circuit diagram showing a construction of a preferred embodiment of a high-voltage charging controller in a charger of the present disclosure.

FIG. 3 is a detailed circuit diagram showing a construction of a preferred embodiment of a high-voltage charging controller in a charger of the present disclosure. Referring to FIG. 3, the high-voltage charging controller 130 includes a charging state detector 300 to detect a charging state of the high-voltage battery BAT1, a charging reference voltage generator 310 that generates a charging reference voltage using an output voltage Vac of the charging state detector 300 and a rectifier 114, a charging current detector 320 that detects a charging current of the high-voltage battery BAT1 output from the first rectifying portion 110, and a switching signal generator 330 that generates a switching signal of the switching devices SW1, SW3, SW5 and SW7 according to output signals of the charging reference voltage generator 310 and charging current detector 320.

In the charging state detector 300, a resistor R1 and R2 are connected between both terminals of the high-voltage BAT1, a connection point of the resistors R1 and R2 is connected to an inverted input terminal (−) of an operational amplifier 302 through a resistor R4, and a floating charging reference voltage Vflo_ref set in advance is applied to a non-inverted input terminal (+) of the operational amplifier 302 so that an output terminal of the operational amplifier 302 is feedback-connected to the inverted input terminal (−) through an impedance Z. Further, an output terminal of the operational amplifier 302 is connected to one input of a minimum value selector 304, and an average voltage Iref of an average current set in advance is applied to the other input terminal of the minimum value selector 304.

The charging reference voltage generator 310 includes an attenuator 312 that attenuates the output voltage Vac of the rectifier 114 as much as set in advance, and a multiplier 314 that multiplies the output voltage of the attenuator 312 by an output signal of the charging state detector 300 to generate a charging reference voltage.

The charging current detector 320 includes a reset unit 322 in which a resistor R5 and a diode D12 are serially connected between both terminals of the current transformer CT1 that detects a current output when the switching device SW1 is switched, to remove a magnetic energy remaining in the current transformer CT1, an integrator 324 in which a diode D13 and a capacitor C2 are serially connected between both terminals of the current transformer CT1, to integrate the detected current of the current transformer CT1, and a switching device SW8 to remove an integral current of the integrator 324.

The switching signal generator 330 includes a comparator 332 that compares an output voltage of the charging current detector 320 with an output voltage of the charging reference voltage generator 310, and a flip-flop device 334 that is set according to a clock signal and reset according to an output signal of the comparator 332, and that generates a switching signal of the switching devices SW1, SW3, SW5 and SW7 at an output terminal Q and generates a switching signal of the switching device SW8 at an output terminal /Q.

In the present disclosure constructed as described above, the charging voltage of the high-voltage battery BAT1 is divided by resistors R1 and R2 of the charging state detector 300, and the divided voltage is applied to the inverted input terminal (−) of the operational amplifier 302.

Further, a floating charging reference voltage Vflo_ref of the high-voltage battery BAT1 set in advance is applied to the non-inverted input terminal (+) of the operational amplifier 302.

The operational amplifier 302 operates and amplifies the voltage level charged in the high-voltage battery BAT1 and the level of the floating charging reference voltage Vflo_ref. The output of the operational amplifier 302 is input to one input terminal of the minimum value selector 304 and an average voltage Iref set in advance is input to the other input terminal of the minimum value selector 304.

The minimum value selector 304 compares levels of the output voltage of the operational amplifier 302 and the average voltage Iref of the reference current set in advance, and then outputs the voltage smaller in magnitude as a charging state detection signal.

Further, the output voltage of the rectifier 114 is input to the attenuator 312 of the charging reference voltage generator 310 and attenuated, and the output signal of the attenuator 312 is multiplied by the charging state detection signal output from the charging state detector 300 in the multiplier 314 so that it generates a charging reference voltage of a half-wave rectified sinusoidal wave as shown in FIG. 4(a), for example and the charging reference voltage of the generated sinusoidal wave is input to an inverted input terminal (−) of the comparator 332 of the switching signal generator 330.

Meanwhile, in the charging current detector 320, a current transformer CT1 detects a charging current output through the switching device SW1 when the switching device SW1 is in a conduction state. Further, when the switching device SW1 is in a shut off state, the magnetic energy accumulated in the current transformer CT1 is removed through a resistor R5 and a diode D12 of the reset unit 322, and the current transformer CT1 detects the charging current output through the switching device SW1 when the switching device SW1 is in a conduction state again.

The charging current detected in the current transformer CT1 is charged in the capacitor C2 through the diode D13 of the integrator 324 and integrated as shown in FIG. 4(b), and the output voltage of the integrator 324 is input to the non-inverted input terminal (+) of the comparator 322 of the switching signal generator 330.

The comparator 332 compares the charging reference voltage of the sinusoidal wave output from the multiplier 314 and the output voltage of the integrator 324 to generate a pulse signal as shown in FIG. 4(c), and the pulse generated from the comparator 332 is applied to a reset terminal R of the flip-flop device 334 and a clock signal CLK such as shown in FIG. 4(d) is applied to the set terminal S of the flip-flop device 334.

Figure 4:
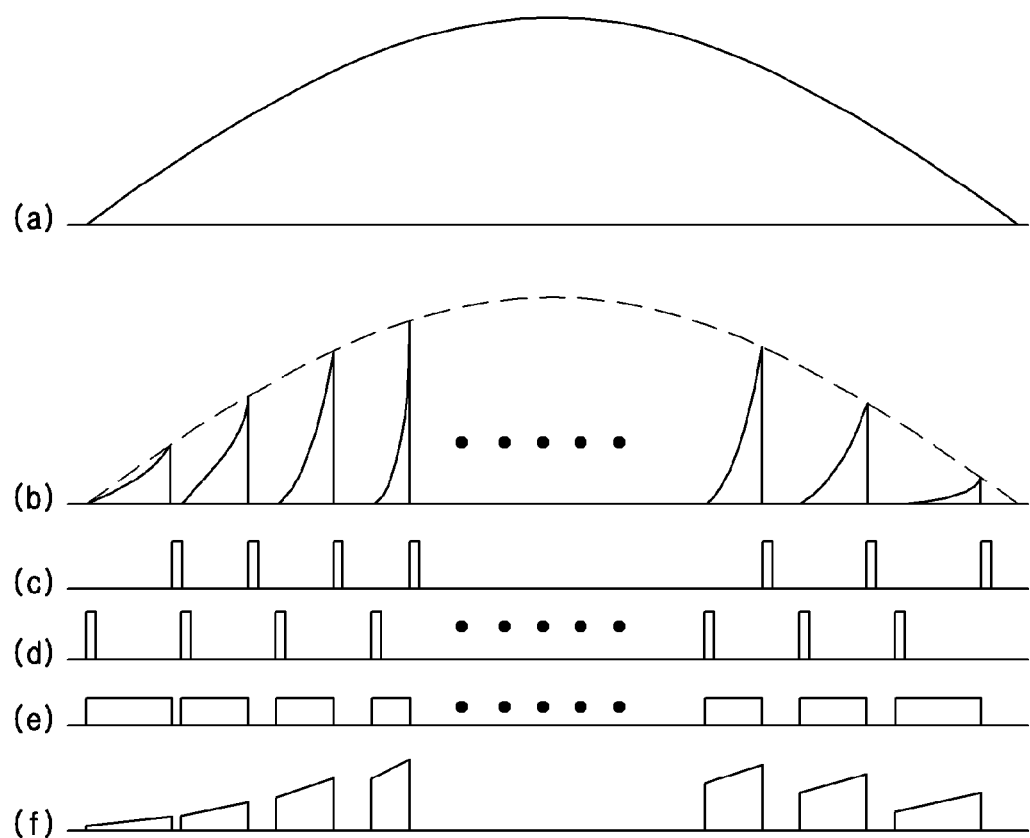
FIGS. 4(a) to 4(f) are waveform diagrams of each section of FIGS. 2 and 3.

Then, while the flip-flop device 334 is set according to the clock signal CLK and reset according to the output signal of the comparator 332, it generates a switching signal to the output terminal Q as shown in FIG. 4, thereby switching the switching devices SW1, SW3, SW5 and SW7.

When the flip-flop device 334 is reset to output a high-voltage of logic 1 to the output terminal (Q), the switching device SW8 is in a conduction state since the output high-voltage of logic 1 is applied to the gate of the switching device SW8, the voltage charged in the capacitor C2 of the integrator 324 is removed through the switching device SW8 and then the integrator 324 integrates the current detected by the current transformer CT1, thereby outputting the pulse signal as shown in FIG. 4(b).

When the flip-flop device 324 is set to output the high-voltage of logic 1 to the output terminal (Q), both the switching device SW1 of the first rectifying portion 110 and the switching devices SW3, SW5 and SW7 of the second rectifying portion/inverter 120 are in a conduction state.

When the switching devices SW1, SW3, SW5 and SW7 are in a conduction state, a commercial alternating power AC input from outside is filtered through and inductor L1 and a capacitor C1 in the filter 112 of the first rectifying portion 110 and its noise signal or the like is removed, bridge rectified in the rectifier 114 and converted into a ripple power.

The ripple power converted in the rectifier 114 is input to a neutral point of the 3-phase motor 100 through the switching device SW1 as shown in FIG. 4(f), and output to terminal of each phase of the 3-phase motor 100.

The charging current output to the terminal of each phase of the 3-phase motor 100 flows into the rectifier 114 through the switching devices SW3, SW5 and SW7 and a ripple power is accumulated in the 3-phase motor 100. That is, the ripple power output from the rectifier 114 flows again into the rectifier 114 through the switching device SW1, 3-phase motor 100 and switching devices SW3, SW5 and SW7 and then the ripple power is accumulated in the 3-phase motor 100.

Further, when the flip-flop device 324 is reset to output a low-voltage of logic 0 to the output terminal Q, both switching device SW1 of the first rectifying portion 110 and switching devices SW3, SW6 and SW7 of the second rectifying portion/inverter 120 are in a shut off state.

When all of the switching devices SW1, SW3, SW5 and SW7 are in a shut off state, the power accumulated in the 3-phase motor 100 flows into the 3-phase motor 100 through the high-voltage battery BAT1 and free wheeling diode D5, and the high-voltage battery BAT1 is charged.

Here, in the case that all of the switching devices SW1, SW3, SW5 and SW7 are in a shut off state, the power accumulated in the 3-phase motor 100 is free wheeled through the free wheeling diode D5 and the high-battery BAT1 is charged, when any one of phase of the 3-phase motor 100 is wired and the current flow is suddenly shut off, the switching devices SW3, SW5 and SW7 may be damaged since a transient voltage is loaded on them.

In this case, according to the present disclosure, a transient voltage suppressing diode TV5 of the transient voltage suppressor 122 is turned on, and the switching devices SW3, SW5 and SW7 is prevented from damaging by the transient voltage.

Figure 5:
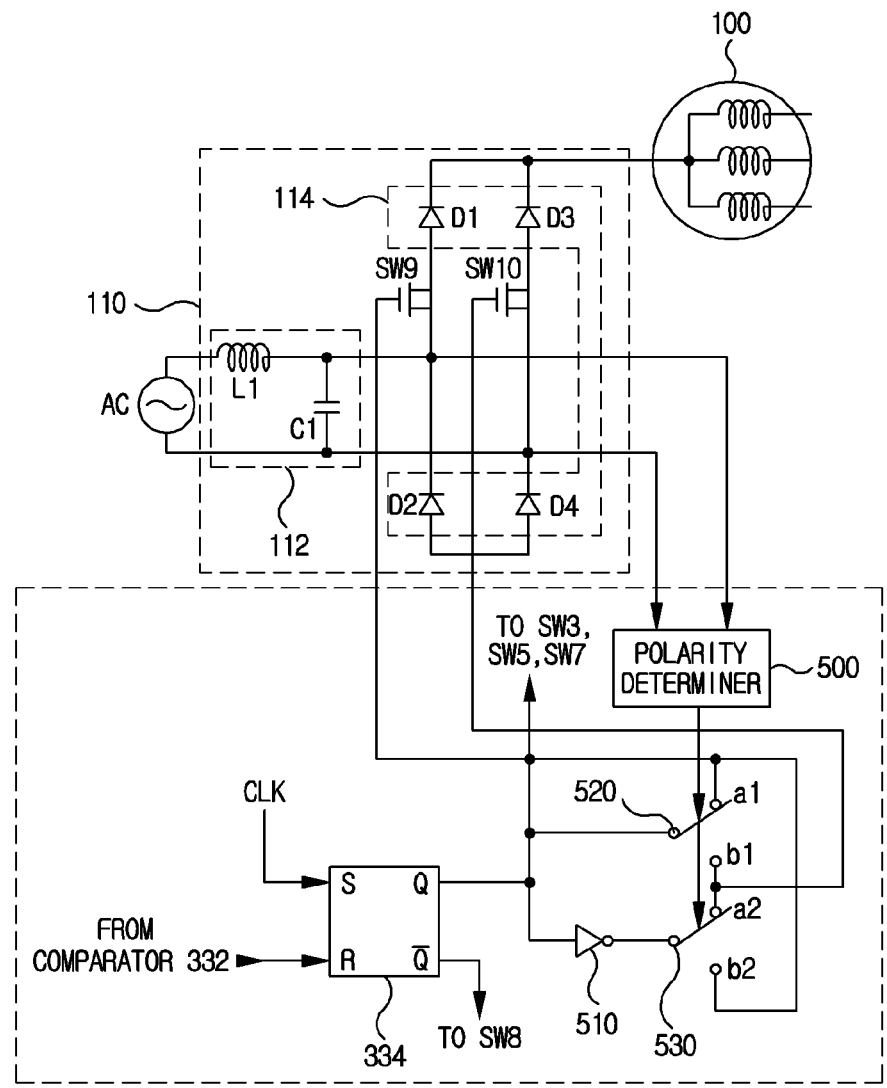
FIG. 5 is a detailed circuit diagram showing another preferred embodiment of a first rectifying portion and a high-voltage charging controller in a charger of the present disclosure.

FIG. 5 is a detailed circuit diagram showing another preferred embodiment of a first rectifying portion and a high-voltage charging controller in a charger of the present disclosure. Referring to FIG. 5, the another embodiment of the first rectifying portion 110 according to the present disclosure includes a filter 112 to filter an input external alternating power AC with an inductor L1 and a capacitor C1, a rectifier 114 that bridge rectifies the output power of the filter 112 with diodes D1 to D4 and outputs the rectified power to a neutral point of the 3-phase motor 100, and a plurality of switching devices SW9 and SW10 that are serially connected to the diodes D1 and D3 and switch the bridge rectifying performed by the rectifier 114.

Further, another embodiment of the high-voltage charging controller according to the present disclosure includes a polarity determiner 500 that determines a polarity of an alternating power output from the filter 112, an inverter 510 that inverts an output signal of an output terminal Q of the flip-flop 334, a first switch 520 that is switched according to an output signal of the polarity determiner 500 and selectively applies the output signal of the output terminal Q of the flip-flop device 334 to a gate of the switching devices SW9 and SW10, and a second switch 530 that is switched according to an output signal of the polarity determiner 500 and selectively applies an output signal of the inverter 510 to the gate of the switching devices SW9 and SW10.

In the another embodiment of the first rectifying portion and high-voltage charging controller according to the present disclosure constructed as described above, a switching signal output from an output terminal Q of the flip-flop device 334 is applied to an operation terminal of the first switching switch 520, and at the same time the switching signal output from the output terminal Q of the flip-flop device 334 is inverted through an inverter 510 and is applied to an operation terminal of the second switch 530.

In this state, the polarity of the alternating power AC that is filtered and output by the filter 112 is determined in the polarity determiner 500, and a control signal is generated according to the determined polarity and applied to a control terminal of the first and second switch switches 520 and 530.

Then, in the first and second switch switches 520 and 530, a switching signal applied to the operation terminal according to the output signal of the polarity determiner 500 is selectively applied to the gate of the switching devices SW9 and SW10.

For example, when a polarity of the alternating power AC applied to a connection point of the inductor L1 and capacitor C1 is a plus polarity, the polarity determiner 500 connects operation terminals of the first and second switches 520 and 530 to one fixing terminals a1 and a2.

Then, the switching signal output from the output terminal Q of the flip-flop device 334 is applied to the gate of the switching device SW9 through the first switch 520, and the switching signal output from the output terminal Q of the flip-flop device 334 is inverted through the inverter 510 and applied to the switching device SW10 through the second switch 530 so that the switching devices SW9 and SW10 are in a conductive state or a shut off state, selectively.

Further, when a polarity of the alternating power AC applied to the connection point of the inductor L1 and capacitor C1 is a minus polarity, the polarity determiner 500 connects the operation terminals of the first and second switches 520 and 530 to the other fixing terminals b1 and b2.

Then, the switching signal output from the output terminal Q of the flip-flop device 334 is applied to the gate of the switching device SW10 through the first switch 520, and the switching signal output from the output terminal Q of the flip-flop device 334 is inverted through the inverter 510 and then applied to the gate of the switching device SW9 through the second switch 530 so that the switching devices SW9 and SW10 is in a conductive state or a shut off state, selectively.

When the flip-flop device 334 outputs a high-voltage of logic 1 through the output terminal Q and a polarity of the alternating power AC applied to the connection of the inductor L1 and capacitor C1 is a plus polarity, the switching device SW9 is in a conductive state and at the same time the switching devices SW3, SW5 and SW7 are in a conductive state.

Then, the alternating power AC filtered in the filter 112 is input to a neutral point of the 3-phase motor 100 through the switching device SW9 and diode D1 and output to terminal of each phase of the 3-phase motor 100, and the power output through terminal of each phase of the 3-phase motor 100 flows into the filter 112 through the switching devices SW3, SW5 and SW7 and a diode D4 so that the 3-phase motor 100 is charged.

When the flip-flop device 334 outputs a low-voltage of logic 0 through the output terminal Q in such a state, and a polarity of the alternating power AC applied to the connection point of the inductor L1 and capacitor C1 is a minus polarity, the switching devices SW3, SW5, SW7 and SW9 are in a shut off state and the switching device SW10 is in a conduction state.

Then, while the power accumulated in the 3-phase motor 100 flows into the neutral point of the 3-phase motor 100 through the diodes D6, D8 and D10, high-voltage battery BAT1, diode D4, switching device SW10 and diode D3, the high-battery BAT1 is charged.

Figure 6:
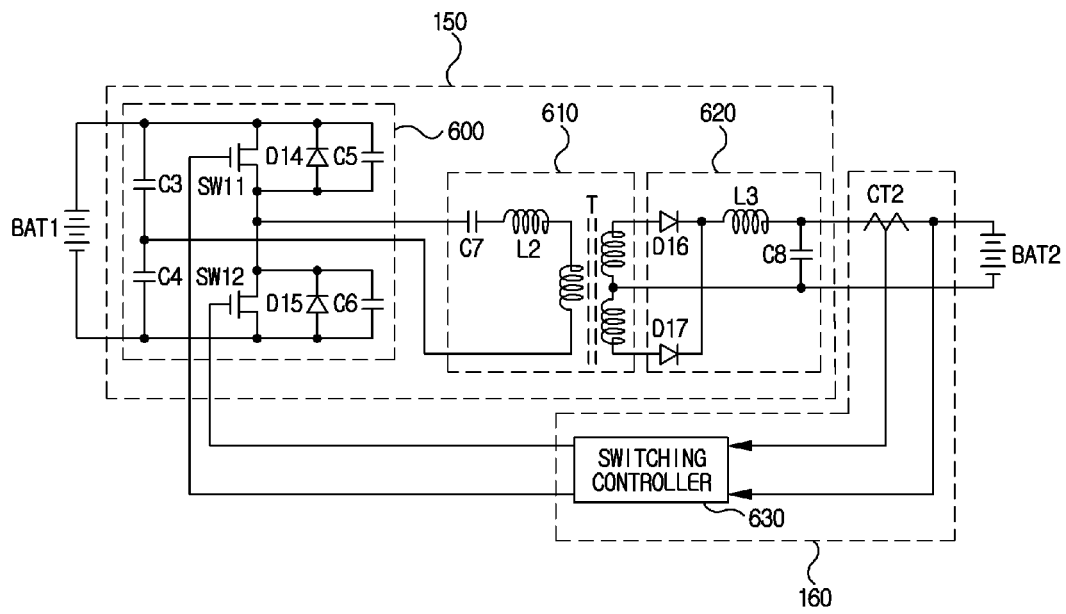
FIG. 6 is a circuit diagram showing a construction of a preferred embodiment of a low-voltage charging controller and a low-voltage charging portion in a charger of the present disclosure.

FIG. 6 is a circuit diagram showing a construction of a preferred embodiment of a low-voltage charging controller and a low-voltage charging portion in a charger of the present disclosure. Referring to FIG. 6, the low-voltage charger 150 includes capacitors C3 to C6 that switch charged power to the high-voltage battery BAT1 and converts the power into an alternating power, an alternating power converter 600 that is constructed of switching devices SW11 and SW12 and diodes D14 and D15, a voltage drop portion 610 constructed of a capacitor C7, an inductor L2 and a transformer T that are used to drop the voltage level of the alternating power converted by the alternating power converter 600, and a direct voltage converter 620 constructed of diodes D16 and D17, an inductor L3 and a capacitor C8 that rectify the alternating power dropped in the voltage drop portion and convert it into the direct power to be charged in the low-voltage battery BAT2.

Further, the low-voltage charging controller 160 according to the present disclosure includes a current transformer CT2 that detects current flowing to the low-voltage battery BAT from the direct voltage converter 620, and a switching controller 630 that generates a switching signal according to a detected current of the current transformer CT2 and a charging voltage of the low-voltage battery BAT2 and applies it to a gate of the switching devices SW11 and SW12 of the alternating power converter 600.

According to the present disclosure constructed as described above, the current transformer CT2 detects the current flowing to the low-voltage battery BAT from the direct voltage converter 620 and inputs it to the switching controller 630, and the charging voltage of the low-voltage battery BAT2 is input to the switching controller 630.

Then, the switching controller 630 determines whether to charge the low-voltage battery BAT2 with the detected current of the current transformer CT2 and the charging voltage of the low-voltage battery BAT2.

Here, the switching signals that the switching controller 630 output to gates of the switching devices SW11 and SW12 have polarities opposite each other.

Then, the power charged in the high-voltage battery BAT1 is converted into an alternating power while the switching devices SW11 and SW12 alternatively repeat conduction state and shut off state.

That is, when the switching device S11 is in a conduction state and the switching device SW12 is in a shut off state, the power charged in the high-voltage battery BAT1 flows into a minus terminal of the high-voltage battery BAT1 through the switching device SW11 and capacitor C4, and the switching device SW11 is in a shut off state. Further, when the switching device SW12 is in a conduction state, the power charged in the high-voltage battery BAT1 flows into a minus terminal of the high-voltage battery BAT1 through the capacitor C5 and switching device SW12 so that it converts into an alternating power.

The alternating power converted in the alternating power converter 600 is applied to a primary coil of the transformer T through the capacitor C7 and inductor L2 of the voltage drop portion 610 and is drop-induced to a secondary coil, and the alternating power that is drop-induced to the secondary coil of the transformer T is rectified in a full-wave through the diodes D16 and D17 of the direct voltage converter 620, converted into a direct voltage through the inductor L3 and capacitor C8, and applied to the low-voltage battery BAT2 to charge.

Meanwhile, in a drive mode in which an electric vehicle is driven, the DSP 140 controls a high-voltage charging controller 130 so as not to enable the first rectifying portion 110 and second rectifying portion/inverter 120 to rectify the alternating power.

Further, the DSP 140 selectively drives the switching devices SW2 to SW7 that are included in the second rectifying portion/inverter 120 and converts the direct power charged in the high-voltage battery BAT1 into a 3-phase alternating power. And, the converted 3-phase alternating power is applied to the 3-phase motor 100 so as to drive it.

Here, it is general that the DSP 140 selectively drives the switching devices SW2 to SW7 that are included in the second rectifying portion/inverter 120 to drive the 3-phase motor 100, and its detailed operation is omitted.

Hereinbefore, while the present disclosure is described in detail with respect to a detail example only, it is clear that one of ordinary skill in the art may recognize that various alterations and modifications that fall within the scope of the present disclosure may be possible. Accordingly, the true technical scope of the present disclosure should be defined by following claims.

What is claimed is:

1. A charger comprising:
   a motor having a Y-connection;
   a rectifier configured to rectify an alternating current power and output the rectified power to a neutral point of the motor;
   a rectifier/inverter configured to charge output power of the rectifier in a first battery in a charging mode and drive the motor by switching the charged power in the first battery in a drive mode;
   a first controller configured to control the rectifier and rectifier/inverter to charge the first battery in the charging mode; and
   a second controller configured to control the rectifier/inverter to drive the motor in the drive mode and to control the first controller to charge the first battery in the charging mode,
   wherein the rectifier includes:
      first diodes configured to bridge-rectify the alternating current power;
      a switching device configured to switch output power of the first diodes to the neutral point of the motor under control of the first controller;
      a filter configured to filter the alternating current power and to output the filtered power to the first diodes; and
      a second diode configured to form a closed loop when the rectifier/inverter charges the output power in the first battery, and
   wherein the first controller includes:
      a first detector configured to detect a charging state of the first battery;
      a first generator configured to generate a charging reference voltage using an output of the first detector and the first diodes;
      a second detector configured to detect a charging current of the first battery output from the rectifier; and
      a second generator configured to generate a switching signal according to an output of the first generator and second detector and to output the switching signal to the rectifier and the rectifier/inverter.

2. The charger according to claim 1, wherein the rectifier further includes a buck-type single-phase rectifier that is coupled to the motor.

3. The charger according to claim 1, wherein the rectifier/inverter includes:
   a plurality of switching devices each serially connected between both terminals of the first battery;
   a plurality of diodes connected in parallel to the plurality of switching devices; and
   a suppressor configured to suppress a transient voltage,
   wherein each terminal of the motor is connected to connection points between each of the plurality of switching devices.

4. The charger according to claim 3, wherein:
   the second controller is further configured to switch the plurality of switching devices in the drive mode; and
   the first controller is further configured to switch the plurality of switching devices in the charging mode.

5. The charger according to claim 1, wherein the first detector includes:
   a plurality of resistors configured to divide a charging voltage of the first battery;

an operational amplifier configured to amplify the divided charging voltage and a preset floating charging reference voltage of the first battery that is set in advance; and a selector configured to select a lower of a level of the output of the operational amplifier and a preset average of a reference current.

6. The charger according to claim 1, wherein the first generator includes:

an attenuator configured to attenuate an output of the first diodes by a preset gain; and a multiplier configured to multiply an output of the attenuator by the output of the first detector.

7. The charger according to claim 1, wherein the second detector includes:

a first current transformer configured to detect the charging current output from the rectifier;

an integrator configured to integrate the charging current detected by the first current transformer;

a reset unit configured to remove magnetic energy accumulated in the first current transformer when the first current transformer does not detect the charging current; and a switching device configured to remove an integrated current accumulated in the integrator according to the switching signal generated by the second generator.

8. The charger according to claim 1, wherein the second generator includes:

a comparator configured to compare outputs of the first generator and the second detector; and a flip-flop device configured to be reset according to an output of the comparator and to generate a switching signal and output the generated switching signal to the second detector, the rectifier and the rectifier/inverter.

9. The charger according to claim 1, further comprising:

a charger configured to charge a charging power of the first battery into a second battery; and a third controller configured to control the charger under control of the second controller.

10. The charger according to claim 9, wherein the charger includes:

a first converter configured to switch the power charged in the first battery and convert the power into an alternating power;

a voltage dropper configured to drop a voltage level of the alternating power from the first converter; and a second converter configured to rectify the dropped alternating power, convert the rectified power into direct power, and charge the direct power into the second battery.

11. The charger according to claim 10, wherein the third controller includes:

a current transformer configured to detect current flowing to the second battery from the charger; and a switching controller configured to generate a switching signal according to current detected by the current transformer and a charging voltage of the second battery and to output the generated switching signal to the first converter.

* * * * *